(12) United States Patent
Ota

(10) Patent No.: US 11,650,771 B2
(45) Date of Patent: May 16, 2023

(54) CONTROL DEVICE, CONTROL SYSTEM, AND NON-TRANSITORY COMPUTER READABLE MEDIUM STORING CONTROL PROGRAM

(71) Applicant: FUJIFILM Business Innovation Corp., Tokyo (JP)

(72) Inventor: Takuya Ota, Kanagawa (JP)

(73) Assignee: FUJIFILM Business Innovation Corp., Tokyo (JP)

( * ) Notice: Subject to any disclaimer, the term of this patent is extended or adjusted under 35 U.S.C. 154(b) by 0 days.

(21) Appl. No.: 17/405,001

(22) Filed: Aug. 17, 2021

(65) Prior Publication Data

US 2022/0229610 A1 Jul. 21, 2022

(30) Foreign Application Priority Data

Jan. 15, 2021 (JP) .............................. JP2021-005243

(51) Int. Cl.
*G06F 3/12* (2006.01)
(52) U.S. Cl.
CPC .......... *G06F 3/1211* (2013.01); *G06F 3/1263* (2013.01)
(58) Field of Classification Search
CPC .............................. G06F 3/1211; G06F 3/1263
See application file for complete search history.

(56) References Cited

U.S. PATENT DOCUMENTS

| 5,740,028 | A | * | 4/1998 | Sugiyama | .......... | H04N 1/32518 |
| | | | | | | 700/28 |
| 9,573,406 | B2 | | 2/2017 | Oki et al. | | |
| 2002/0063884 | A1 | * | 5/2002 | Bhogal | ................. | G06F 3/1211 |
| | | | | | | 358/1.15 |
| 2002/0174104 | A1 | * | 11/2002 | Yokoyama | .......... | G03G 15/5079 |
| 2010/0195155 | A1 | * | 8/2010 | Gustafson | ............. | G06Q 10/06 |
| | | | | | | 358/1.15 |

(Continued)

FOREIGN PATENT DOCUMENTS

| JP | 2015219718 A | * | 12/2015 |
| JP | 2016149062 | | 8/2016 |
| JP | 6226564 | | 11/2017 |

*Primary Examiner* — Huo Long Chen
(74) *Attorney, Agent, or Firm* — JCIPRNET

(57) ABSTRACT

A control device includes a processor that controls a printing manufacturing process including printing processing and post-processing in plural types of printing manufacture, in which the processor is configured to: according to an occurrence of an event in which the printing processing has ended but printing manufacture to be performed again is required, acquire information about a type of a sheet from printing manufacture information about printing manufacture having a delivery date; predict a time required for each processing of the printing manufacturing process in the printing manufacture; calculate an end time of reprinting manufacture, in which the printing manufacture to be performed again is required, in a case where the reprinting manufacture is incorporated so as to be continuous with other printing manufacture in which the same sheet as the reprinting manufacture is used; and perform control to determine whether or not to incorporate the reprinting manufacture so that the reprinting manufacture is continuous with the other printing manufacture depending on whether or not the end time is in time for the delivery date.

11 Claims, 6 Drawing Sheets

(56) References Cited

U.S. PATENT DOCUMENTS

| | | | |
|---|---|---|---|
| 2012/0327463 A1* | 12/2012 | Mizuno | G06F 3/1288 358/1.15 |
| 2013/0050758 A1* | 2/2013 | Kanai | G03G 15/6541 358/1.15 |
| 2014/0009773 A1* | 1/2014 | Horigane | G06F 3/1213 358/1.13 |

* cited by examiner

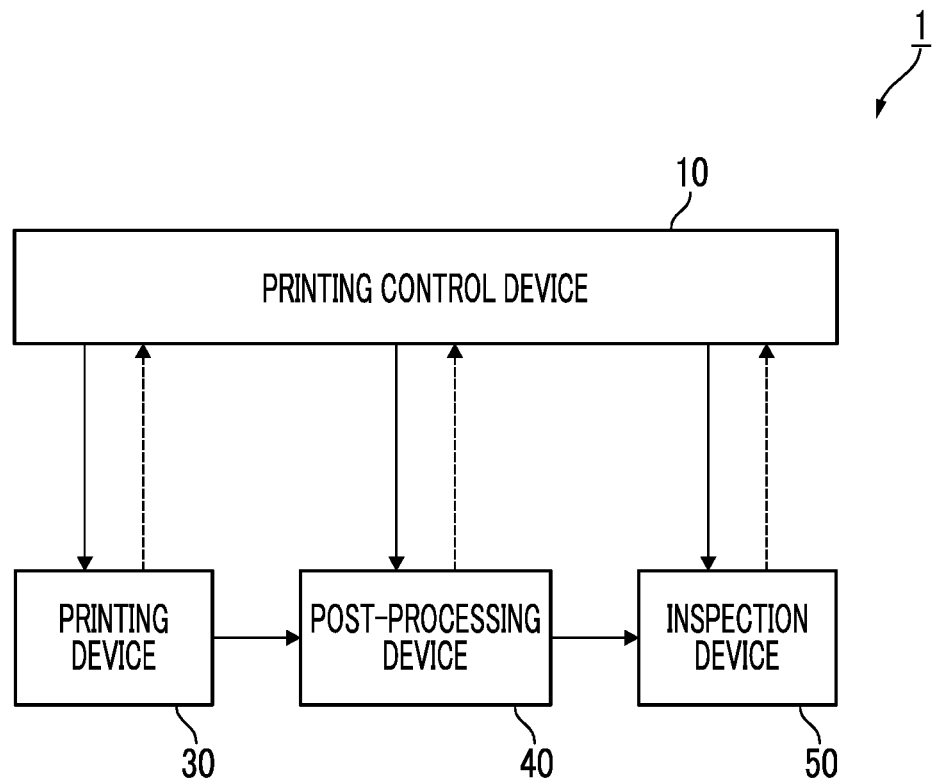
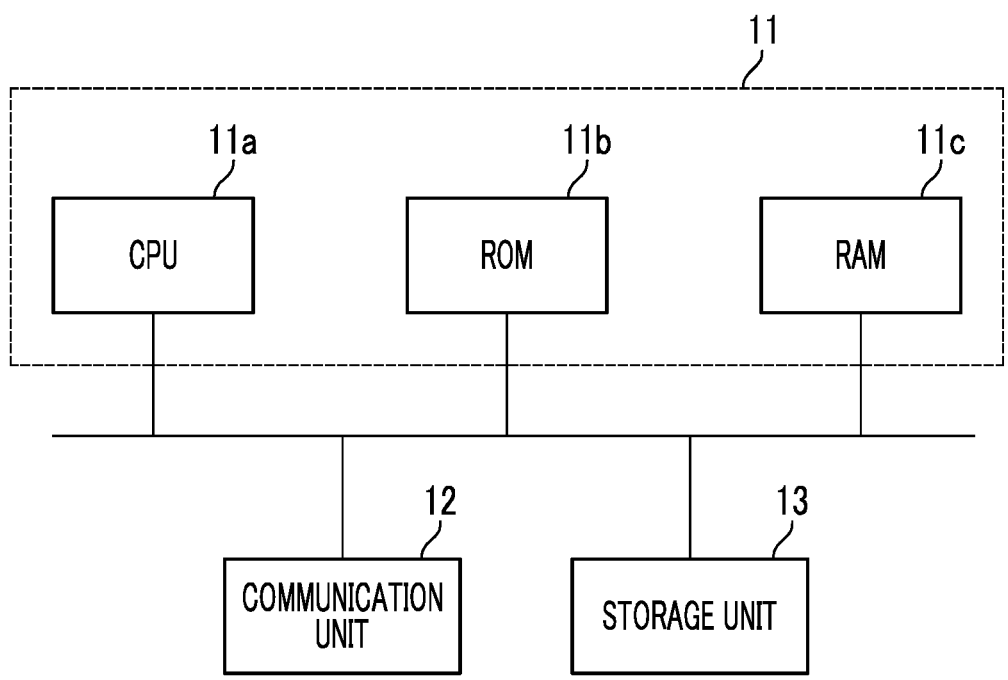

FIG. 5

| ESTIMATED END TIME POINT OF PRINTING PROCESSING | JOB INFORMATION ID | TYPE OF SHEET |
|---|---|---|
| 12:30 | 100 | C |
| 13:15 | 101 | A |
| 14:00 | 102 | A |
| 14:15 | 103 | B |
| 15:15 | 104 | C |
| 15:45 | 105 | C |
| 16:15 | 106 | A |
| 17:00 | 107 | A |

CONTROL DEVICE, CONTROL SYSTEM, AND NON-TRANSITORY COMPUTER READABLE MEDIUM STORING CONTROL PROGRAM

CROSS-REFERENCE TO RELATED APPLICATIONS

This application is based on and claims priority under 35 USC 119 from Japanese Patent Application No. 2021-005243 filed Jan. 15, 2021.

BACKGROUND

(i) Technical Field

The present invention relates to a control device, a control system, and a non-transitory computer readable medium storing a control program.

(ii) Related Art

JP6226564B discloses configuration in which control ensuring the continuity of the same type of product in each process is performed with regard to the production of a plurality of types of products consisting of a printing process, a post-processing process, and an inspection process.

JP2016-149062A discloses configuration in which sorting processing is performed on the basis of the continuity of sheet information between print jobs in a case where a printed product consisting of a plurality of parts is created using a plurality of printers.

SUMMARY

Printing manufacture to be performed again is required in a case where a defective product occurs in a post-processing process or an inspection process. In such a case, each processing of the printing manufacture is assigned again. Performing the exchange of a sheet or the adjustment of a device for only the printing manufacture to be performed again is inefficient and causes a worker's burden.

However, in a case where the printing manufacture to be performed again is incorporated with merely the use of the same sheet so that the printing manufacture to be performed again and other printing manufacture are continuous with each other, there is a possibility that the printing manufacture may not be in time for a delivery date.

Aspects of non-limiting embodiments of the present disclosure relate to a control device, a control system, and a non-transitory computer readable medium storing a control program that reduce a worker's burden in a range satisfying a delivery date as compared to a case where printing manufacture to be performed again is generated and a delivery date and the continuity of a sheet are not considered.

Aspects of certain non-limiting embodiments of the present disclosure overcome the above disadvantages and/or other disadvantages not described above. However, aspects of the non-limiting embodiments are not required to overcome the disadvantages described above, and aspects of the non-limiting embodiments of the present disclosure may not overcome any of the disadvantages described above.

According to an aspect of the present disclosure, there is provided a control device including a processor that controls a printing manufacturing process including printing processing and post-processing in a plurality of types of printing manufacture, in which the processor is configured to: according to an occurrence of an event in which the printing processing has ended but printing manufacture to be performed again is required, acquire information about a type of a sheet from printing manufacture information about printing manufacture having a delivery date; predict a time required for each processing of the printing manufacturing process in the printing manufacture; calculate an end time of reprinting manufacture, in which the printing manufacture to be performed again is required, in a case where the reprinting manufacture is incorporated so as to be continuous with other printing manufacture in which the same sheet as the reprinting manufacture is used; and perform control to determine whether or not to incorporate the reprinting manufacture so that the reprinting manufacture is continuous with the other printing manufacture depending on whether or not the end time is in time for the delivery date.

BRIEF DESCRIPTION OF THE DRAWINGS

Exemplary embodiment(s) of the present invention will be described in detail based on the following figures, wherein:

FIG. 1 is a diagram showing an example of the overall configuration of a printing control system according to the present exemplary embodiment;

FIG. 2 is a block diagram showing an example of the hardware configuration of a printing control device according to the present exemplary embodiment;

FIG. 5 is a table showing an example of job information stored in a storage unit;

DETAILED DESCRIPTION

Figure 3:
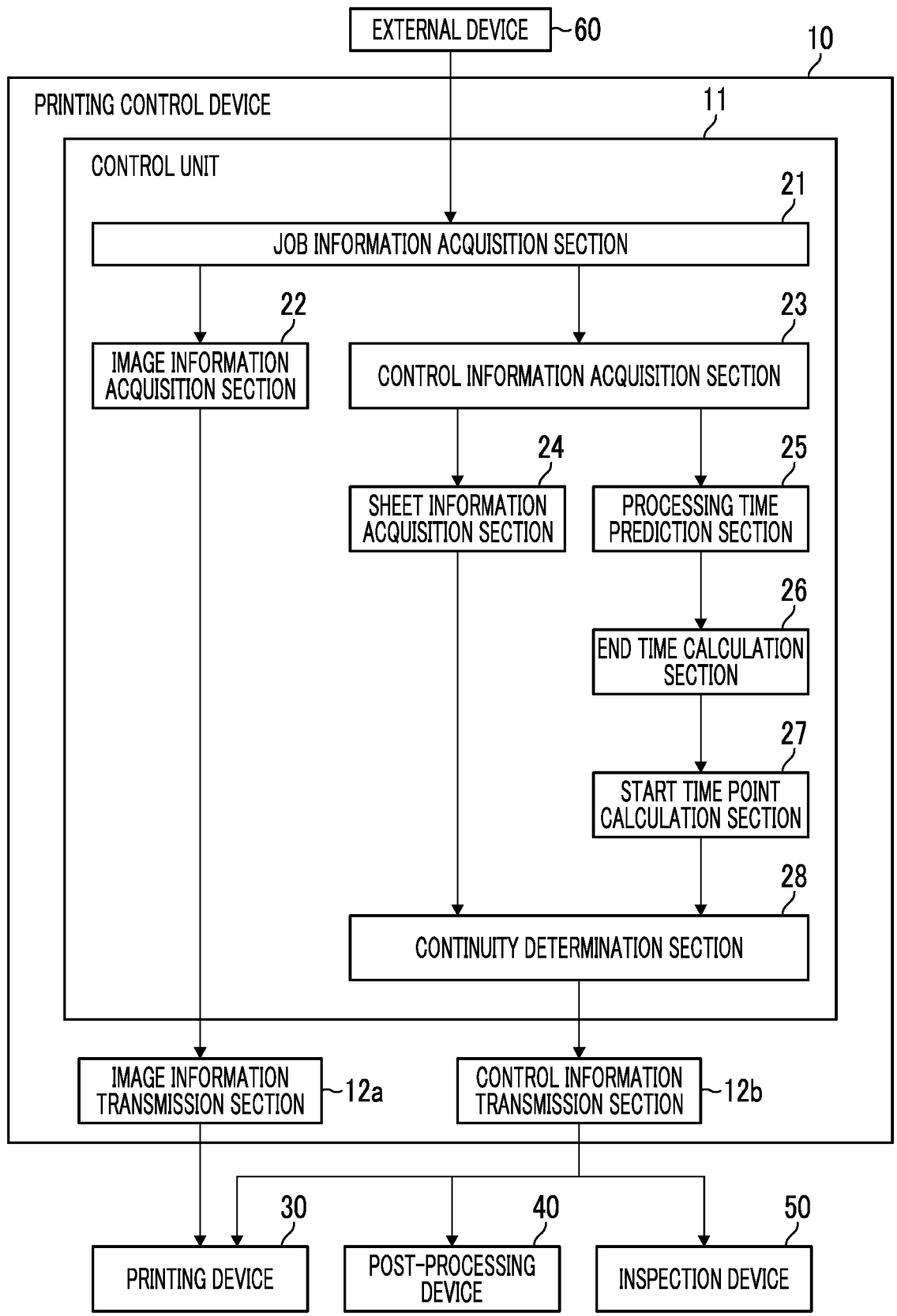
FIG. 3 is a block diagram showing an example of the functional configuration of the printing control device.

Exemplary embodiments of the present invention will be described in detail below with reference to the accompanying drawings.

Overall Configuration of Printing Control System

The overall configuration of a printing control system according to the present exemplary embodiment will be described first.

FIG. 1 is a diagram showing an example of the overall configuration of the printing control system according to the present exemplary embodiment. The printing control system 1 according to the present exemplary embodiment includes, for example, a printing control device 10 that controls the overall printing control system 1, a printing device 30, and a post-processing device 40. The printing control system 1 according to the present exemplary embodiment may further include an inspection device 50 that inspects a printed product output from the post-processing device 40.

The printing control device 10 is a device that is used to control a printing manufacturing process including printing processing and post-processing in a plurality of types of printing manufacture. Further, the printing device 30 is a device used to form an image on a recording material to output the image, that is, used to perform so-called printing processing. The post-processing device 40 is a device that is used to perform post-processing, such as cutting, folding, and binding, on a printed matter output from the printing device 30. The respective devices, such as the printing device 30, the post-processing device 40, and the inspection device 50, perform information communication with the printing control device 10 through, for example, a network.

Hardware Configuration of Printing Control Device

Next, the hardware configuration of the printing control device 10 according to the present exemplary embodiment will be described.

FIG. 2 is a block diagram showing an example of the hardware configuration of the printing control device 10 according to the present exemplary embodiment. The printing control device 10 according to the present exemplary embodiment includes a control unit 11, a communication unit 12, and a storage unit 13.

The control unit 11 controls the operation of each unit of the printing control device 10. The control unit 11 includes a central processing unit (CPU) 11a that is an example of a processor and controls the overall device, a read only memory (ROM) 11b that stores a program and the like to be executed by the CPU 11a, and a random access memory (RAM) 11c that is used as a work area during the calculation performed by the CPU 11a.

Here, the program to be executed by the CPU 11a as an example of a processor is provided to the control unit 11 in a state where the program is stored in a computer-readable recording medium. Examples of the recording medium include magnetic recording mediums (a magnetic tape, a magnetic disc, and the like), optical recording mediums (an optical disc, and the like), a magneto-optical recording medium, and a semiconductor memory, and the like.

Further, the program to be executed by the CPU 11a may be downloaded to the control unit 11 using communication means, such as the Internet.

In the embodiments above, the term "processor" refers to hardware in a broad sense. Examples of the processor include general processors (e.g., CPU: Central Processing Unit) and dedicated processors (e.g., GPU: Graphics Processing Unit, ASIC: Application Specific Integrated Circuit, FPGA: Field Programmable Gate Array, and programmable logic device).

In the embodiments above, the term "processor" is broad enough to encompass one processor or plural processors in collaboration which are located physically apart from each other but may work cooperatively. The order of operations of the processor is not limited to one described in the embodiments above, and may be changed.

The communication unit 12 is, for example, an interface for communication that is connected to a network. The communication unit 12 performs information communication with the respective devices, such as the printing device 30, the post-processing device 40, and the inspection device 50. Examples of information to be received by the communication unit 12 include job information that is printing manufacture information about printing manufacture having a delivery date, information about an error of each device, information about consumables of each device, and the like. Examples of information to be transmitted by the communication unit 12 include image information, control information about a printing manufacturing process, and the like.

The storage unit 13 is formed of a hard disk drive, a semiconductor memory, or the like and stores job information, image information, information transmitted from each device, and the like.

Functional Configuration of Control Unit

Next, the functional configuration of the control unit 11 will be described.

FIG. 3 is a block diagram showing an example of the functional configuration of the control unit 11. The control unit 11 includes a job information acquisition section 21, an image information acquisition section 22, a control information acquisition section 23, a sheet information acquisition section 24, a processing time prediction section 25, an end time calculation section 26, a start time point calculation section 27, and a continuity determination section 28. In FIG. 3, the communication unit 12 shown in FIG. 2 is divided into an image information transmission section 12a that transmits image information and a control information transmission section 12b that transmits control information and the like according to the functions thereof.

The job information acquisition section 21 acquires job information from information that is transmitted from an external device 60 and is received by the communication unit 12. The job information includes image information and control information, such as a delivery date, the type of a sheet, and the contents of processing of printing manufacture.

The image information acquisition section 22 acquires image information about an image, which is formed in printing processing, from the job information that is acquired by the job information acquisition section 21. The acquired image information is transmitted to the printing device 30 from the image information transmission section 12a.

The control information acquisition section 23 acquires control information about a printing manufacturing process from the job information that is acquired by the job information acquisition section 21.

The sheet information acquisition section 24 acquires information about the type of a sheet, such as the size of a sheet, from the control information that is included in the job information acquired by the job information acquisition section 21. The sheet information acquisition section 24 functions as an example of an acquisition section that acquires information about the type of a sheet from the printing manufacture information about printing manufacture having a delivery date.

The processing time prediction section 25 predicts a processing time from information, which is related to a processing time, of the control information that is included in the job information. The information related to a processing time includes the number of pages to be printed, the type of image, such as a monochrome printing or color printing, whether or not there is a post-processing process, the contents of post-processing, the type of a sheet to be printed, and the like. Information about the processing capability of the printing device 30 or the post-processing device 40 and information about a time taken for inspection performed by the inspection device 50, and the like are also used for the prediction of the processing time. The processing time prediction section 25 functions as an example of a prediction section that predicts a time required for each processing of the printing manufacturing process in the printing manufacture. Each processing is processing that is performed by one or a plurality of devices among the printing device 30, the post-processing device 40, and the inspection device 50.

The end time calculation section 26 calculates a time when the printing manufacture is to end (hereinafter, referred to as an "end time"). The "end time" includes, for example, information about a period, such as a time unit, a day unit, or a week unit, in addition to a time point. For example, a delivery date and the like of a schedule also correspond to the "end time". The end time calculation section 26 calculates an end time when specific printing manufacture is to end using a time required for each processing that is predicted by the processing time prediction section 25. Printing conditions, such as the incorporation of specific printing manufacture so that the type of a sheet to be used in the specific printing manufacture and the type of a sheet to be used in the other printing manufacture are continuous and the incorporation of specific printing manufacture in the head of other job information, are added in a case where this calculation is made. Here, examples of "the types of sheets are continuous" include a case where specific printing manufacture and the other printing manufacture using the same sheet as the specific printing manufacture are continuous.

In the present exemplary embodiment, attention is paid to an event in which printing processing has ended but printing manufacture to be performed again (hereinafter, referred to as "reprinting manufacture") is required. The end time calculation section 26 functions as an example of a calculation section that performs processing of calculating an end time in a case where the reprinting manufacture is performed. "An event in which ~ is required" to which attention is paid is not an event, such as "paper jam" where work is performed in a device and reprinting can be performed instantly but an event, such as the stain of a printed matter or a trouble in post-processing.

The start time point calculation section 27 uses the end time, which is calculated by the end time calculation section 26, to calculate the latest time point of start in time for a delivery date (hereinafter, referred to as "the latest start time point") among time points when the respective processing of a specific printing manufacturing process starts.

The continuity determination section 28 determines to incorporate specific printing manufacture in certain printing manufacture so that the types of sheets are continuous in a range satisfying the delivery date. The control information, which is determined by the continuity determination section 28, is transmitted to the respective devices from the control information transmission section 12b. The continuity determination section 28 functions as an example of a determination section that determines whether or not to cause reprinting manufacture to be continuous with the other printing manufacture depending on whether or not the end time is in time for the delivery date.

Flow of Printing Processing in Reprinting Manufacture

Next, the flow of printing processing in reprinting manufacture will be described with reference to FIGS. 4 and 5.

Figure 4:
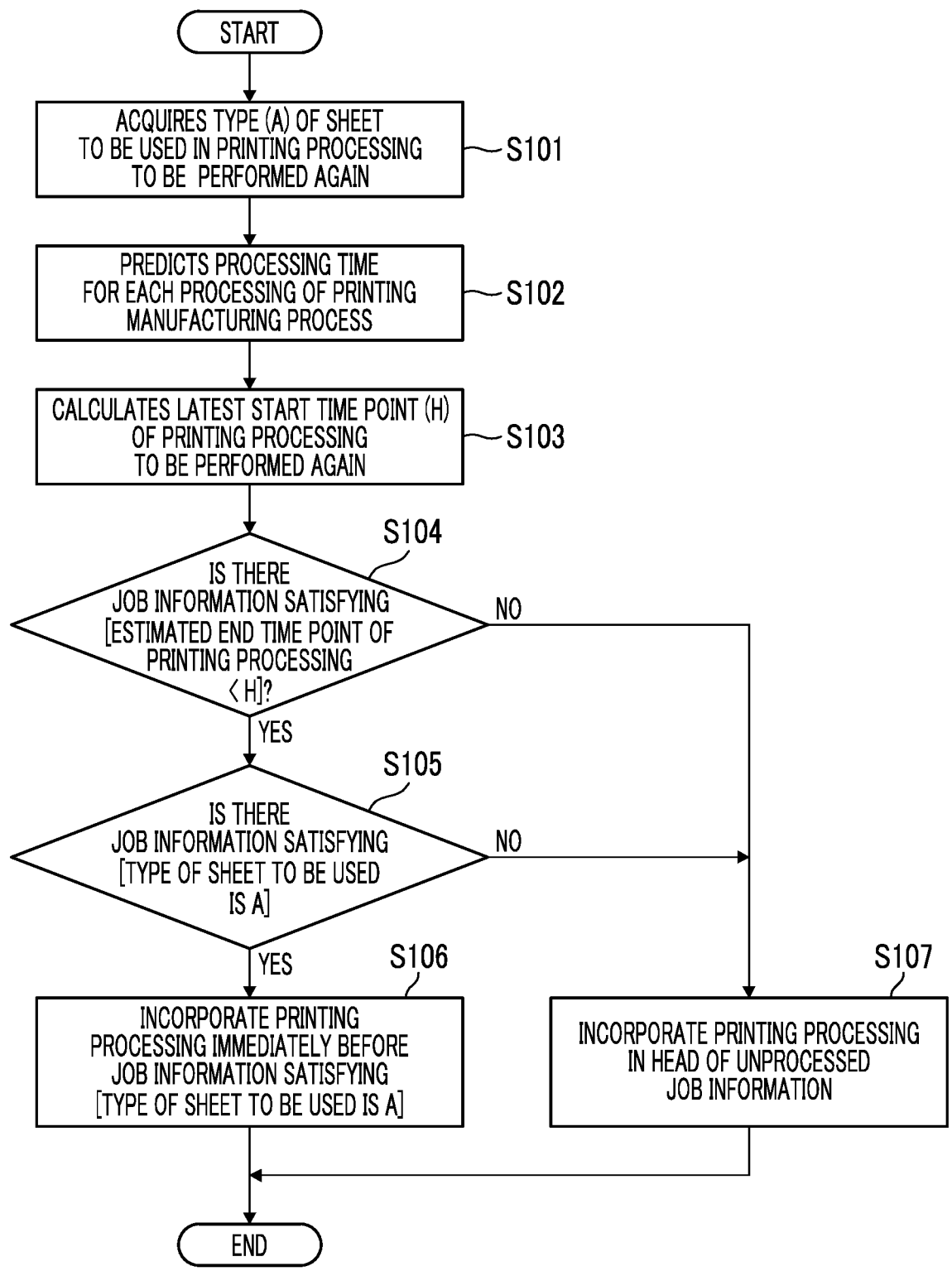
FIG. 4 is a flowchart showing a procedure for incorporating printing processing that is to be performed again by the printing control device.

FIG. 4 is a flowchart showing a procedure for incorporating printing processing that is to be performed again by the printing control device 10. FIG. 5 is a table showing an example of the job information stored in the storage unit 13.

First, the sheet information acquisition section 24 shown in FIG. 3 acquires information of "the type of a sheet to be used in the printing processing to be performed again is (A)." from the control information about reprinting manufacture having the delivery date that is acquired by the control information acquisition section 23 (Step S101). The processing time prediction section 25 predicts a time required for each processing of the printing manufacturing process in the reprinting manufacture from the control information or the sheet information that is acquired by the sheet information acquisition section 24 (Step S102). For example, the processing time prediction section 25 predicts 30 min as a time required for printing processing, predicts 30 min as a time required for post-processing, and predicts 30 min as a time required for inspection. Then, the start time point calculation section 27 calculates the latest start time point (H) of the printing processing, which is to be performed again, using the information about the end time that is calculated by the end time calculation section 26 (Step S103). For example, in a case where the delivery date of the job information acquired by the control information acquisition section 23 is 17:00 and the end time calculation section 26 calculates that 1 hour and 30 minutes is required for the reprinting manufacture, the start time point calculation section 27 calculates 15:30 as the latest start time point (H) of the printing processing that is to be performed again.

Next, the continuity determination section 28 determines whether or not there is job information in which printing processing is to end before the latest start time point (H) of the printing processing to be performed again, that is, job information satisfying [estimated end time point of printing processing<H] (Step S104). In a case where there is job information satisfying [estimated end time point of printing processing<H] (YES in Step S104), the continuity determination section 28 determines whether or not there is job information satisfying [the type of a sheet to be used is A] (Step S105). It is assumed that there are, for example, a plurality of pieces of job information shown in FIG. 5 as other job information. Other job information before the latest start time point (H) 15:30 of the printing processing to be performed again is job information IDs 100, 101, 102, 103, and 104. In this example, there is job information satisfying [the type of a sheet to be used is A].

In a case where there is job information satisfying [the type of a sheet to be used is A] in Step S105 (YES in Step S105), the continuity determination section 28 incorporates the printing processing, which is to be performed again, immediately before the job information satisfying [the type of a sheet to be used is A] (Step S106). In the example shown in FIG. 5, the job information satisfying [the type of a sheet to be used is A] is the job information IDs 101 and 102. Accordingly, in this example, the printing processing to be performed again is incorporated immediately before the job information ID 101 and the processing ends. Since the job information IDs 101 and 102 satisfy [estimated end time point of printing processing<H] in the example shown in FIG. 5, the printing processing to be performed again does not necessarily need to be incorporated immediately before the job information ID 101 and may be incorporated between the job information ID 101 and the job information ID 102 or after the job information ID 102.

In a case where there is no job information satisfying [estimated end time point of printing processing<H] in Step S104 (NO in Step S104), the printing processing to be performed again is incorporated in the head so as to precede any other unprocessed job information (Step S107) and the processing ends.

Further, in a case where there is no job information satisfying [the type of a sheet to be used is A] in Step S105 (NO in Step S105), the printing processing to be performed again is incorporated in the head so as to precede any other unprocessed job information (Step S107) and the processing ends.

Flow of Printing Processing, Post-Processing, and Inspection in Reprinting Manufacture In the example shown in FIG. 4, attention has been paid to only the printing processing in the reprinting manufacture and the printing processing has been incorporated so that the types of sheets are continuous. However, attention can be paid to other processing and processing can be incorporated so that the types of sheets are continuous in a range satisfying the delivery date.

Figure 6A:
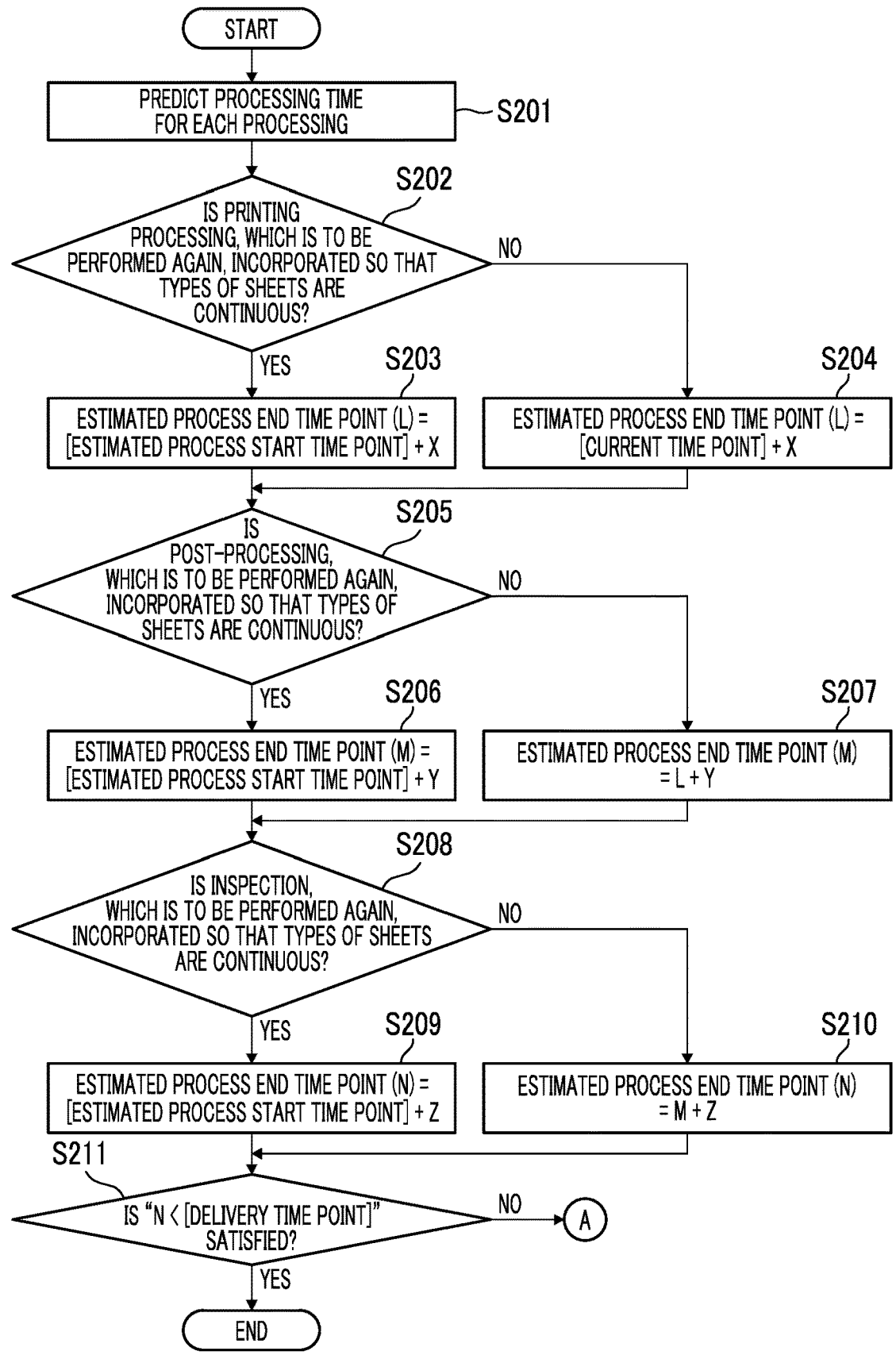
FIG. 6A is a flowchart showing a procedure for incorporating printing manufacture that is to be performed again by the printing control device.
Figure 6B:
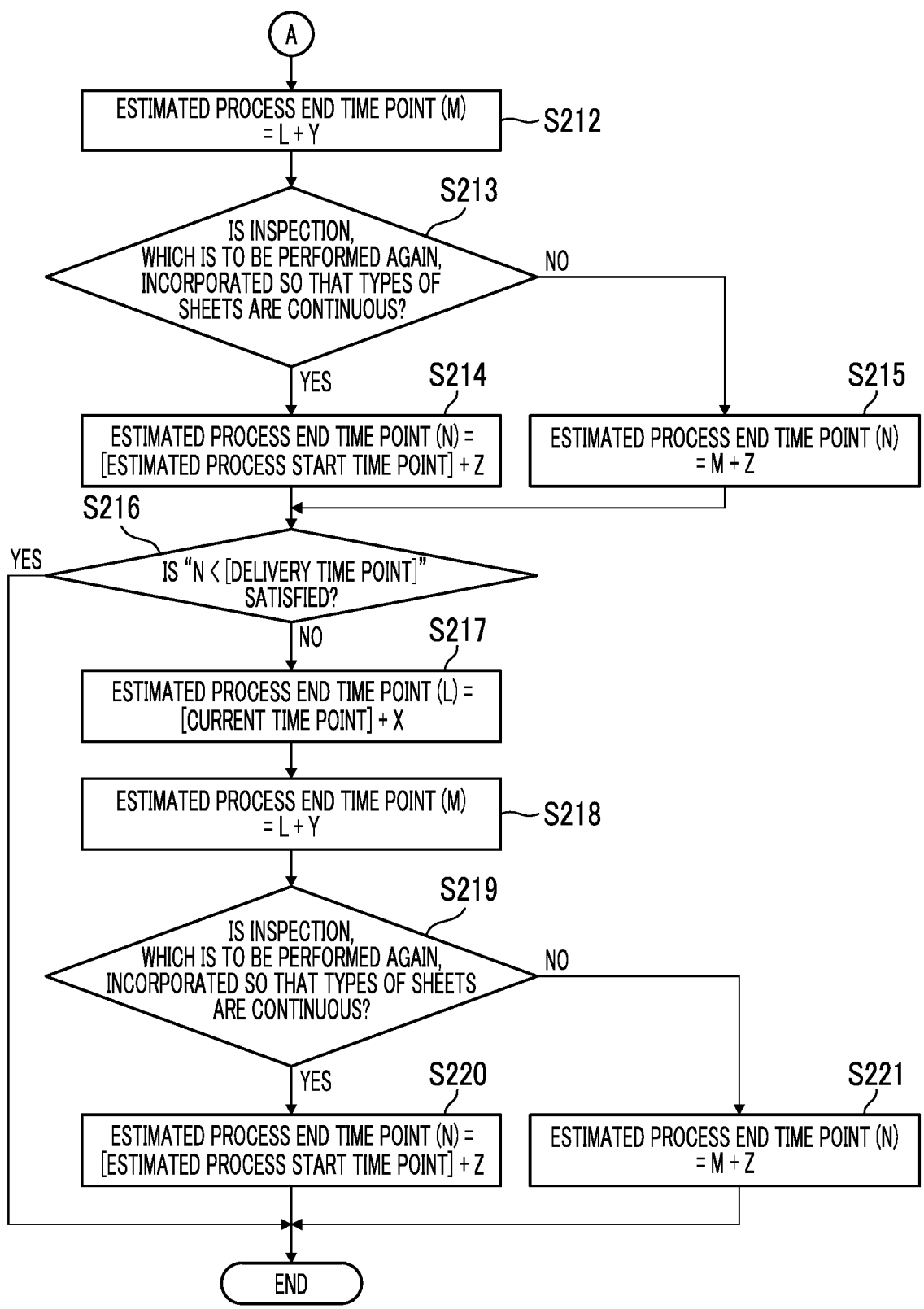
FIG. 6B is a flowchart showing the procedure for incorporating printing manufacture that is to be performed again by the printing control device.

FIGS. 6A and 6B are flowcharts showing a procedure for incorporating reprinting manufacture that is to be performed by the printing control device. Here, it is assumed that the sheet information acquisition section 24 has already acquired the type of a sheet for the reprinting manufacture from the job information acquired by the job information acquisition section 21.

First, in FIG. 6A, the processing time prediction section 25 predicts a processing time for each processing of the printing manufacturing process in the reprinting manufacture from the control information acquired by the control information acquisition section 23 and the sheet information acquired by the sheet information acquisition section 24 (Step S201). For example, the processing time prediction section 25 predicts X min as a time required for printing processing, predicts Y min as a time required for post-processing, predicts Z min as a time required for inspection, and the like. Then, the continuity determination section 28 determines whether or not to incorporate the printing processing to be performed again so that the types of sheets are continuous in a range satisfying the delivery date (Step S202). Here, the range satisfying the delivery date is a range in which [current time point]+X+Y+Z, which is calculated as the end time by the end time calculation section 26, satisfies a delivery time point.

In a case where the incorporation of the printing processing to be performed again so that the types of sheets are continuous is performed in Step S202 (YES in Step S202), the end time calculation section 26 calculates an estimated process end time point (L) of the printing processing by the sum of an estimated time point in which a process of the printing processing is started and a time (X) required for the printing processing and sets "(L)=[estimated process start time point]+X" (Step S203). The printing processing to be performed again is incorporated immediately before other job information with which the types of sheets are continuous.

In a case where the incorporation of the printing processing to be performed again so that the types of sheets are continuous is not performed in Step S202 (NO in Step S202), the end time calculation section 26 calculates the estimated process end time point (L) of the printing processing by the sum of the current time point and the time (X) required for the printing processing and sets "(L)=[current time point]+X" (Step S204). The printing processing to be performed again is incorporated in the head of unprocessed job information so as to precede any other job information.

The continuity determination section 28 determines whether or not to incorporate post-processing to be performed again on the basis of the calculated estimated process end time point (L) of the printing processing so that the types of sheets are continuous in a range satisfying the delivery date (Step S205). Here, the range satisfying the delivery date is a range in which [estimated process end time point (L)]+Y+Z, which is calculated as the end time by the end time calculation section 26, satisfies the delivery time point.

In a case where the incorporation of the post-processing to be performed again so that the types of sheets are continuous is performed in Step S205 (YES in Step S205), the end time calculation section 26 calculates an estimated process end time point (M) of the post-processing by the sum of an estimated time point in which a process of the post-processing is started and a time (Y) required for the post-processing and sets "(M)=[estimated process start time point]+Y" (Step S206).

In a case where the incorporation of the post-processing to be performed again so that the types of sheets are continuous is not performed in Step S205 (NO in Step S205), the end time calculation section 26 calculates the estimated process end time point (M) of the post-processing by the sum of the estimated process end time point (L) of the printing processing and the time (Y) required for the post-processing and sets "(M)=L+Y" (Step S207).

The continuity determination section 28 determines whether or not to incorporate inspection to be performed again on the basis of the calculated estimated process end time point (M) of the post-processing so that the types of sheets are continuous in a range satisfying the delivery date (Step S208). Here, the range satisfying the delivery date is a range in which [estimated process end time point (M)]+Z, which is calculated as the end time by the end time calculation section 26, satisfies the delivery time point.

In a case where the incorporation of the inspection to be performed again so that the types of sheets are continuous is performed in Step S208 (YES in Step S208), the end time calculation section 26 calculates an estimated process end time point (N) of the inspection by the sum of an estimated time point in which a process of the inspection is started and a time (Z) required for the inspection and sets "(N)=[estimated process start time point]+Z" (Step S209).

In a case where the incorporation of the inspection to be performed again so that the types of sheets are continuous is not performed in Step S208 (NO in Step S208), the end time calculation section 26 calculates the estimated process end time point (N) of the inspection by the sum of the estimated process end time point (M) of the post-processing and the time (Z) required for the inspection and sets "(N)=M+Z" (Step S210). The estimated process end time point (N) is an example of the end time of the reprinting manufacture that is calculated by the addition of the printing conditions.

The continuity determination section 28 determines whether or not "[estimated process end time point (N)]< [delivery time point]" is satisfied on the basis of the calculated estimated process end time point (N) (Step S211).

In a case where "[estimated process end time point (N)]<[delivery time point]" is satisfied (YES in Step S211), the end time of the reprinting manufacture is in time for the delivery date. Accordingly, the processing ends.

In a case where "[estimated process end time point (N)]<[delivery time point]" is not satisfied in Step S211 (NO in Step S211), the processing proceeds to Step S212 of FIG. 6B.

The end time calculation section 26 recalculates the estimated process end time point (M) of the post-processing by the sum of the estimated process end time point (L) of the printing processing and the time (Y) required for the post-processing and sets "(M)=L+Y" (Step S212).

The continuity determination section 28 determines whether or not to incorporate the inspection to be performed again on the basis of the recalculated estimated process end time point (M) of the post-processing so that the types of sheets are continuous in a range satisfying the delivery date (Step S213).

In a case where the incorporation of the inspection to be performed again so that the types of sheets are continuous is performed in Step S213 (YES in Step S213), the end time calculation section 26 recalculates the estimated process end time point (N) of the inspection by the sum of an estimated time point in which a process of the inspection is started and the time (Z) required for the inspection and sets "(N)= [estimated process start time point]+Z" (Step S214).

In a case where the incorporation of the inspection to be performed again so that the types of sheets are continuous is not performed in Step S213 (NO in Step S213), the end time calculation section 26 recalculates the estimated process end time point (N) of the inspection by the sum of the estimated process end time point (M) of the post-processing and the time (Z) required for the inspection and sets "(N)=M+Z" (Step S215).

The continuity determination section 28 determines whether or not "[estimated process end time point (N)]< [delivery time point]" is satisfied on the basis of the recalculated estimated process end time point (N) of the inspection (Step S216).

In a case where "[estimated process end time point (N)]<[delivery time point]" is satisfied (YES in Step S216), the end time of the reprinting manufacture is in time for the delivery date. Accordingly, the processing ends.

In a case where "[estimated process end time point (N)]<[delivery time point]" is not satisfied in Step S216 (NO in Step S216), the end time calculation section 26 recalculates the estimated process end time point (L) of the printing processing by the sum of the current time point and the time (X) required for the printing processing and sets "(L)= [current time point]+X" (Step S217).

Then, the end time calculation section 26 recalculates the estimated process end time point (M) of the post-processing by the sum of the estimated process end time point (L) of the printing processing and the time (Y) required for the post-processing and sets "(M)=L+Y" (Step S218).

The continuity determination section 28 determines whether or not to incorporate inspection to be performed again on the basis of the recalculated estimated process end time point (M) of the post-processing so that the types of sheets are continuous in a range satisfying the delivery date (Step S219).

In a case where the incorporation of the inspection to be performed again so that the types of sheets are continuous is performed in Step S219 (YES in Step S219), the end time calculation section 26 recalculates the estimated process end time point (N) of the inspection by the sum of an estimated time point in which a process of the inspection is started and the time (Z) required for the inspection and sets "(N)= [estimated process start time point]+Z" (Step S220). Then, the processing ends.

In a case where the incorporation of the inspection to be performed again so that the types of sheets are continuous is not performed in Step S219 (NO in Step S219), the end time calculation section 26 recalculates the estimated process end time point (N) of the inspection by the sum of the estimated process end time point (M) of the post-processing and the time (Z) required for the inspection and sets "(N)=M+Z" (Step S221). Then, the processing ends.

In a case where a plurality of pieces of or all processing of the reprinting manufacture process are incorporated so that the types of sheets are continuous as described above, an end time may not be in time for the delivery date. However, in the present exemplary embodiment, the printing processing to be performed again is incorporated immediately before other printing processing in which the types of sheets are continuous, and other processing to be performed again is incorporated so that an end time is in time for the delivery date. Alternatively, the downstream processing of the printing manufacturing process to be performed again is incorporated not to be continuous with the other printing manufacture in which the same sheet as the preceding printing manufacture to be performed again is used. The end time of the reprinting manufacture is caused to be in time for the delivery date by these processing.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. A control device comprising:
a processor that controls a printing manufacturing process including printing processing and post-processing in a plurality of types of printing manufacture,
wherein the processor is configured to:
according to an occurrence of an event in which the printing processing of the printed manufacture having a delivery date has ended but reprinting manufacture is required,
acquire information about a type of a sheet to be used in the reprinting manufacture, wherein the reprinting manufacture is to perform the printing manufacture again;
predict a time required for each processing of the printing manufacturing process in the reprinting manufacture;
calculate an end time of the reprinting manufacture, in a case where the reprinting manufacture is incorporated, so as to be continuous with other printing manufacture in which the same sheet as the reprinting manufacture is used; and
perform control to determine whether or not to incorporate the reprinting manufacture so that the reprinting manufacture is continuous with the other printing manufacture depending on whether or not the end time of the reprinting manufacture is in time for the delivery date of the printing manufacture.

2. The control device according to claim 1, wherein the processor is configured to:
perform control so that the reprinting manufacture is continuous with the other printing manufacture in a case where the end time is in time for the delivery date.

3. The control device according to claim 2, wherein the processor is configured to:
perform control so that the reprinting manufacture is immediately before the other printing manufacture and the end time of the reprinting manufacture is in time for the delivery date.

4. The control device according to claim 1, wherein the processor is configured to:
perform control so that the reprinting manufacture precedes any other unprocessed printing manufacture without being continuous with the other printing manufacture in which the same sheet as the reprinting manufacture is used, in a case where the end time is not in time for the delivery date.

5. The control device according to claim 1, wherein the processor is configured to:
perform control so as to determine whether or not to cause the reprinting manufacture to be continuous with the other printing manufacture depending on each processing of the printing manufacturing process.

6. The control device according to claim 5, wherein the processor is configured to:
perform control so as to determine whether or not to cause the reprinting manufacture to be continuous with the other printing manufacture in a case where with the reprinting manufacture caused to be continuous with the other printing manufacture in all processing of the printing manufacturing process, the end time is not in time for the delivery date.

7. The control device according to claim 6, wherein the processor is configured to:
control the printing processing of the printing manufacturing process so that the reprinting manufacture is immediately before the other printing manufacture; and
control the other processing except for the printing processing so that the end time is in time for the delivery date.

8. The control device according to claim 6, wherein the processor is configured to:
perform control so that the reprinting manufacture is caused not to be continuous with the other printing manufacture in which the same sheet as the reprinting manufacture is used and downstream processing of the printing manufacturing process is caused to precede to allow the end time to be in time for the delivery date.

9. The control device according to claim 1,
wherein the reprinting manufacture is performed in a case where a product of the printing process is defective in a post-processing process or an inspection process.

10. A control system that includes a printing device and a post-processing device and controls a printing manufacturing process including printing processing and post-processing in a plurality of types of printing manufacture, the control system comprising:
according to an occurrence of an event in which the printing processing of the printing manufacture having a delivery date has ended but reprinting manufacture is required,
an acquisition section that acquires information about a type of a sheet to be used in the reprinting manufacture, wherein the reprinting manufacture is to perform the printing manufacture again;
a prediction section that predicts a time required for each processing of the printing manufacturing process in the reprinting manufacture;
a calculation section that uses the time, which is predicted by the prediction section, to calculate an end time of the reprinting manufacture, in a case where the reprinting manufacture is incorporated so as to be continuous with other printing manufacture in which the same sheet as the reprinting manufacture is used; and
a determination section that determines whether or not to incorporate the reprinting manufacture so that the reprinting manufacture is continuous with the other printing manufacture depending on whether or not the end time of the reprinting manufacture calculated by the calculation section is in time for the delivery date of the printing manufacture.

11. A non-transitory computer readable medium storing a control program causing a computer to implement various functions of a printing manufacturing process including printing processing and post-processing in a plurality of types of printing manufacture, the control program causing the computer to implement:
according to an occurrence of an event in which the printing processing of the printing manufacture having a delivery date has ended but reprinting manufacture is required,
a function of acquiring information about a type of a sheet to be used in the reprinting manufacture info illation about printing manufacture, wherein the reprinting manufacture is to perform the printing manufacture again;
a function of predicting a time required for each processing of the printing manufacturing process in the reprinting manufacture;
a function of calculating an end time of the reprinting manufacture, in a case where the reprinting manufacture is incorporated, so as to be continuous with other printing manufacture in which the same sheet as the reprinting manufacture is used; and
a function to performing control to determine whether or not to incorporate the reprinting manufacture so that the reprinting manufacture is continuous with the other printing manufacture depending on whether or not the end time of the reprinting manufacture is in time for the delivery date of the printing manufacture.

* * * * *